US012266918B2

(12) United States Patent
Mathew et al.

(10) Patent No.: US 12,266,918 B2
(45) Date of Patent: Apr. 1, 2025

(54) CONSTANT-CLUTCH OPERATION AT POWER TOOL START-UP

(71) Applicant: Black & Decker Inc., New Britain, CT (US)

(72) Inventors: Sona R. Mathew, Towson, MD (US); Daniel F. Nace, Towson, MD (US); Jason D. McKillican, Baltimore, MD (US); Christopher T. King, Catonsville, MD (US)

(73) Assignee: Black & Decker Inc., New Britain, CT (US)

( * ) Notice: Subject to any disclaimer, the term of this patent is extended or adjusted under 35 U.S.C. 154(b) by 111 days.

(21) Appl. No.: 17/948,356

(22) Filed: Sep. 20, 2022

(65) Prior Publication Data

US 2024/0097431 A1    Mar. 21, 2024

(51) Int. Cl.
| | |
|---|---|
| *H02P 6/16* | (2016.01) |
| *B25F 5/00* | (2006.01) |
| *H02H 7/08* | (2006.01) |
| *H02K 7/14* | (2006.01) |
| *H02P 9/04* | (2006.01) |
| *H02P 15/00* | (2006.01) |
| *H02P 21/22* | (2016.01) |

(52) U.S. Cl.
CPC .......... *H02H 7/0822* (2013.01); *B25F 5/001* (2013.01); *H02K 7/145* (2013.01); *H02P 15/00* (2013.01)

(58) Field of Classification Search
CPC .................................... H02P 1/04; H02P 6/28
See application file for complete search history.

(56) References Cited

U.S. PATENT DOCUMENTS

| | | | |
|---|---|---|---|
| 4,622,779 | A | 11/1986 | Schadlich |
| 6,320,286 | B1 | 11/2001 | Ramarathnam |
| 9,073,186 | B2 | 7/2015 | Kusakawa |
| 10,411,558 | B2 | 9/2019 | Forster et al. |
| 10,549,396 | B2 | 2/2020 | Matsunaga et al. |
| 10,659,803 | B2 | 5/2020 | Chen et al. |

(Continued)

FOREIGN PATENT DOCUMENTS

| | | |
|---|---|---|
| EP | 3363598 B1 | 10/2019 |
| WO | 2015179364 A2 | 11/2015 |
| WO | 2021220705 A1 | 11/2021 |

OTHER PUBLICATIONS

Extended European Search Report mailed Mar. 4, 2024 in related EP application No. 23194964.5, 7pages.

*Primary Examiner* — Kawing Chan
*Assistant Examiner* — Charles S Laughlin
(74) *Attorney, Agent, or Firm* — Amir R. Rohani

(57) ABSTRACT

A method of operating a power tool having a motor and a controller is provided. The method includes: setting a protection time limit associated with a condition of the motor; taking protective action to shut down the motor if the condition of the motor persists for a duration of the protection time limit; and in response to occurrence of the condition during a start-up period of operation of the motor, extending the protection time limit for a duration of a constant-clutch time period to allow an output speed of the motor to reach or exceed a speed threshold, and taking protective action to shut down the motor if the output speed of the motor remains below the speed threshold for the duration of the constant-clutch time period.

17 Claims, 3 Drawing Sheets

(56) References Cited

U.S. PATENT DOCUMENTS

| | | |
|---|---|---|
| 10,883,660 B2 | 1/2021 | Nishimiya et al. |
| 10,903,775 B2 | 1/2021 | Hosokawa et al. |
| 11,171,542 B2 | 11/2021 | Vanko et al. |
| 2007/0084613 A1 | 4/2007 | Zhang et al. |
| 2012/0074881 A1* | 3/2012 | Pant .......................... B25F 5/00 318/400.09 |
| 2016/0031072 A1* | 2/2016 | Lim ........................ B25B 21/00 173/178 |
| 2017/0190032 A1* | 7/2017 | Leong ................. B25B 23/1475 |
| 2019/0047133 A1* | 2/2019 | Beckert ............... B25B 23/1475 |
| 2020/0060085 A1 | 2/2020 | Coon |
| 2021/0394326 A1 | 12/2021 | Wiker et al. |
| 2021/0394389 A1 | 12/2021 | Feng et al. |

* cited by examiner

CONSTANT-CLUTCH OPERATION AT POWER TOOL START-UP

FIELD OF THE DISCLOSURE

This disclosure relates to power tools and in particular to grinding power tools.

BACKGROUND

Various anti-kickback protection schemes for power tools have been employed over the years. One such example is US Reissue Patent RE44993E1, which is incorporated herein by reference in its entirety, and discloses a system that detects a kickback condition when the motor current exceeds a predetermined kickback current threshold, and takes protective action (e.g., by shutting down the tool) accordingly. What is needed is an anti-kickback mechanism that can ensure proper operation of the power tool various stages of the power tool operation.

SUMMARY

According to an embodiment of the invention, a method of operating a power tool having a motor and a controller is provided, the method comprising: setting a protection time limit associated with a condition of the motor; taking protective action to shut down the motor if the condition of the motor persists for a duration of the protection time limit; and in response to occurrence of the condition during a start-up period of operation of the motor, extending the protection time limit for a duration of a constant-clutch time period to allow an output speed of the motor to reach or exceed a speed threshold, and taking protective action to shut down the motor if the output speed of the motor remains below the speed threshold for the duration of the constant-clutch time period.

In an embodiment, the condition of the motor is an overcurrent condition where a current level drawn by the motor exceeds a protective current threshold.

In an embodiment, the protection time limit associated with the condition of the motor is set to a first time value during the start-up period of operation of the motor and to a second time value that is less than the first time value during a normal operation of the motor.

In an embodiment, the condition of the motor is an underspeed condition where the output speed of the motor is smaller than an underspeed threshold.

In an embodiment, the underspeed threshold is set to a value that is smaller than the speed threshold during a normal operation of the motor.

In an embodiment, the extending the protection time limit step is in response to at least one of the motor being in a stuck rotor condition or the output speed of the motor being below a minimum speed threshold while the current draw exceeds a current threshold.

In an embodiment, the protective action comprises electronically braking the motor.

According to an embodiment, a power tool is provided including a housing, a motor disposed within the housing, and a control unit configured to control a supply of power to the motor from a power source. In an embodiment, the control unit includes a controller configured to execute one or more of the steps described above.

BRIEF DESCRIPTION OF THE DRAWINGS

The drawings described herein are for illustrative purposes only of selected embodiments and not all possible implementations, and they are not intended to limit the scope of the present disclosure.

Corresponding reference numerals indicate corresponding parts throughout the several figures of the drawings.

DETAILED DESCRIPTION

Figure 1:
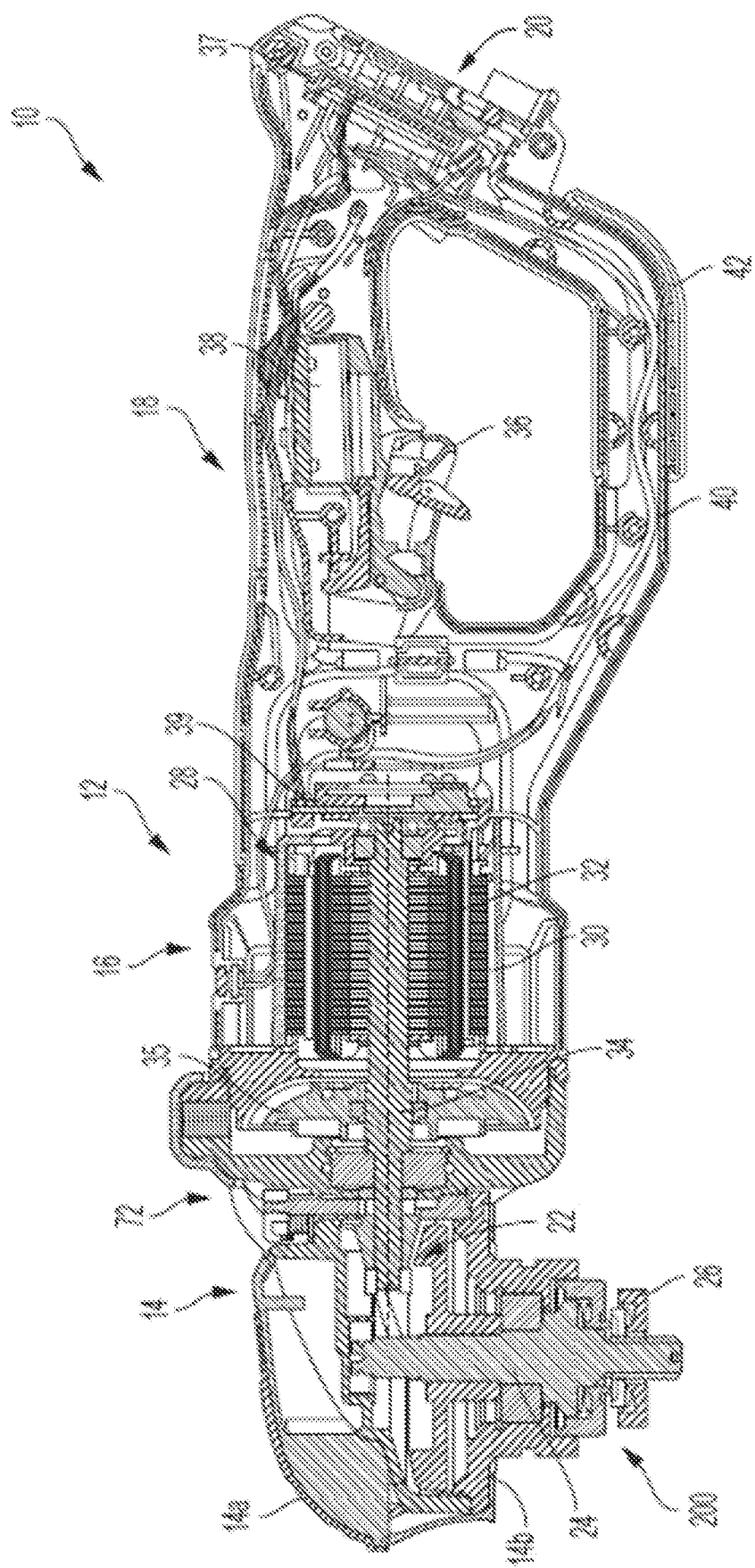
FIG. 1 is a side cross-sectional view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 is a side cross-sectional view of a power tool 10, according to an embodiment. In an embodiment, power tool 10 is provided including a housing 12 having a gear case 14, a motor case 16, a handle portion 18, and a battery receiver 20. Power tool 10 as shown herein is a large angle grinder (LAG) with the gear case 14 housing a gearset 22 that drives an output spindle 24 arranged to be coupled to a grinding or cutting disc (not shown, herein referred to as "accessory wheel"), either via threads on the disc, or via a flange (or threaded nut) 26 and guarded by a disc guard (not shown). It should be understood, however, that the teachings of this disclosure may apply to any other power tool including, but not limited to, small or medium angle grinders, saws, drills, sanders, electric hammers, and the like. Gearset 22 may include the output spindle 24 at a 90-degree angle orientation or in a linear orientation. In an embodiment, gear case 14 includes an upper gear case cover 14a and a lower gear case cover 14b that cooperatively house the gearset 22 components.

In an embodiment, the motor case 16 attaches to a rear end of the gear case 14 and houses a motor 28 operatively connected to the gear set 22. An intermediary plate or baffle may be disposed between the motor case 16 and the rear end of the gear case 14. In an embodiment, the motor 28 is a brushless direct-current (BLDC) motor having a stator 30 and a rotor 32 rotatable relative to the stator 30. The rotor 32 is mounted on a rotor shaft 34 that rotatably drives the output spindle 24 via the gearset 22. A fan 35 is mounted on the rotor shaft 34 between the motor 28 and the gear case 14, facing the intermediary plate or baffle, to generate an airflow for cooing the motor 28 and other components. The airflow generated by the fan 35 exits through an air exhaust vent 72 provided on the motor case 16 and/or the gear case 14.

In an embodiment, the handle portion 18 extends from a rear end of the motor case 16 and includes a trigger switch 36 operatively connected to a switch assembly 38. The switch assembly 38 is in turn coupled to a control module 37 that includes a programmable controller and controls a switching operation of a power module 39. In an embodiment, the control module 37 is disposed at a rear of the handle portion 18 adjacent the battery receiver 20. The battery receiver 20 is provided at the rear end of the handle portion 18 for detachable engagement with a battery pack (not shown) to provide power to the motor 28.

In an embodiment, a second handle 40 is provided that extends from the rear end of the motor case 16 to the battery receiver 20, at least partially in parallel to the handle portion 18. In an embodiment, second handle 40 is a D-handle designed to enhance structural support for the handle portion 18 and the battery pack and improve drop performance of the power tool 10. In an embodiment, second handle 40 is provided with a bumper 42 arranged to absorb shock during drop or impact. In an embodiment, bumper 42 is made of an overmold material.

In an exemplary embodiment, the battery pack may be a 60-volt max lithium-ion type battery pack, although battery packs with other battery chemistries, shapes, voltage levels, etc. may be used in other embodiments. In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

In an embodiment, the power module 39 is disposed at a rear of the motor 28, i.e. between the motor case 16 and the handle portion 18. In an embodiment, power module 39 is a circuit board oriented radially adjacent the end of the motor 28 including a series of Field-Effect Transistors (FETs) interconnected as a multi-phase inverter circuit for powering the phases of the motor 28. In an embodiment, control module 37, switch assembly 38, and power module 39 may be provided discretely or integrated into sub-assemblies.

In an embodiment, the control module 37 uses the input from the trigger assembly 38 to set a target speed for the motor 28. This is done by controlling a pulse-width modulation (PWM) of the power switches within the power module 39. When the trigger switch 36 is released, in an embodiment, the control module 37 activates the low-side switches or the high-side switches of the power module 39 simultaneously for regenerative electronic braking of the motor 28. A description of the power and control modules and electronic braking of the motor can be found in US Patent Publication No. 2017/0234484, filed Feb. 10, 2017, which is incorporated herein by reference in its entirety.

Braking of the motor at high speed, either electronically or via a mechanical brake, causes rapid deceleration of the output spindle 24. Absent a mechanism to retain and protect the accessory wheel, high inertia of the accessory wheel can cause it to detach from the output spindle 24 upon rapid deceleration. For this reason, in some configurations, the nut 26 may be provided with a spring mechanism to apply an upward force on the accessory wheel to increase friction between the accessory disc and an upper flange of the power tool 10. Additionally, and/or alternatively, in some configurations, the power tool 10 may be provided with a wheel retention mechanism configured to apply a downward force on the accessory wheel to similarly increase the friction between the accessory disc and the upper flange of the power tool 10 as well as the friction between the threads of the accessory wheel and the output spindle 24, resulting in an increased accessory unseating torque. This increased friction significantly reduces the likelihood of the accessory wheel coming off the output spindle 24.

Figure 2:
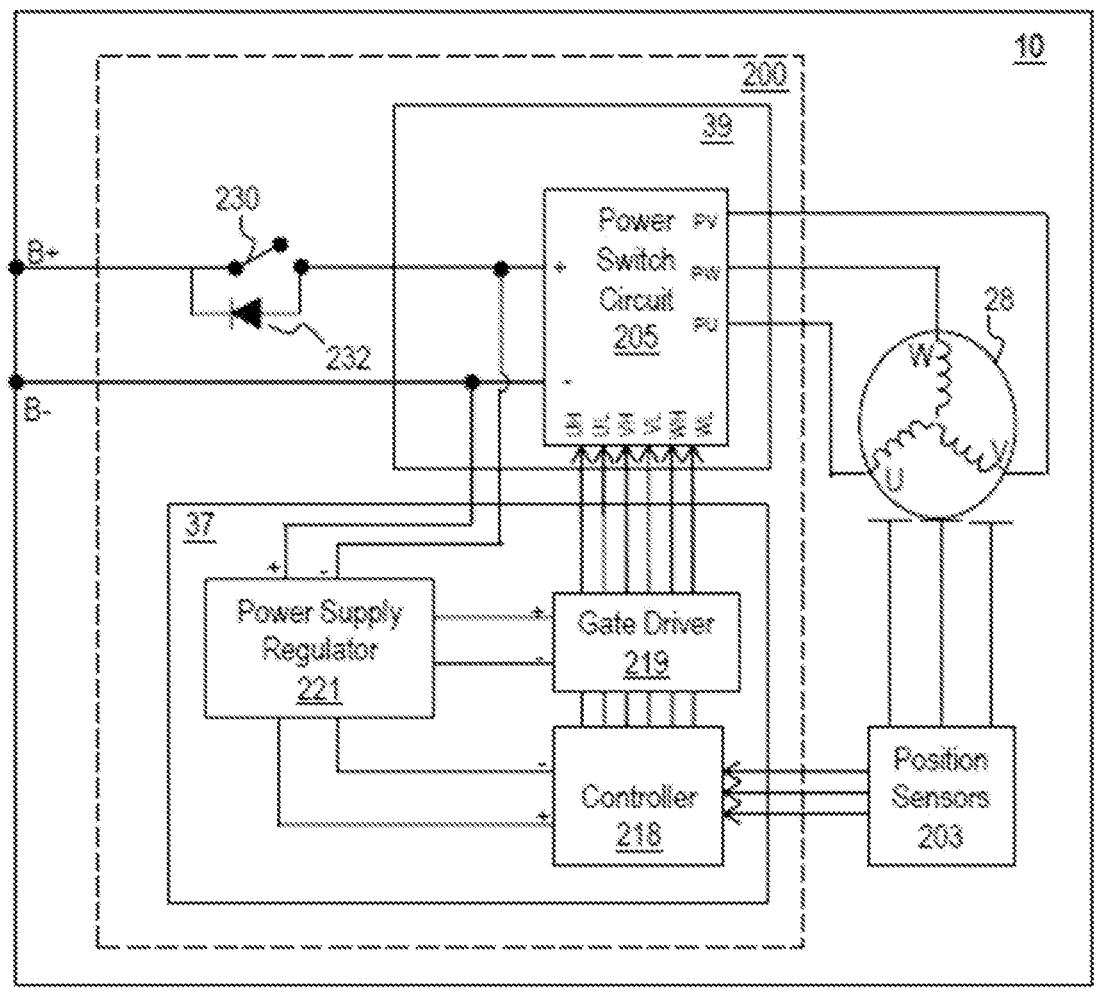
FIG. 2 depicts an exemplary block circuit diagram for an electronic control module for controlling the power tool motor, according to an embodiment.

Referring to FIG. 2, a circuit block diagram of the power tool 10 including motor 28 and an electronic control module 200 for controlling the motor 28 is depicted, according to an embodiment. In an embodiment, power tool 100 received DC power from a DC power source such as a battery pack via B+ and B− terminals.

In an embodiment, electronic control module 200 includes the power module 39 and the control module 37 briefly discussed above.

In an embodiment, power module 39 may include a power switch circuit 205 coupled between the power source B+/B− terminals and motor windings to drive BLDC motor 28. In an embodiment, power switch circuit 205 may be a three-phase bridge driver circuit including six controllable semiconductor power devices (e.g. FETs, BJTs, IGBTs, etc.).

In an embodiment, control module 37 may include a controller 218, a gate driver 219, and a power supply regulator 221. In an embodiment, controller 218 is a programmable device arranged to control a switching operation of the power devices in power switching circuit 226. In an embodiment, controller 218 receives rotor rotational position signals from a set of position sensors 203 provided in close proximity to the motor 104 rotor. In an embodiment, position sensors 203 may be Hall sensors. It should be noted, however, that other types of positional sensors may be alternatively utilized.

In an embodiment, controller 218 is activated by upon the initial actuation of the trigger switch 36. In an embodiment, a variable voltage signal indicative of the desired speed of the motor 28 may be additionally provided to the controller 218. The variable voltage signal may be provided from the trigger switch 36 and correspond to the distance by which the trigger switch 36 has bene pressed by the operation, or from a secondary switching mechanism such as a speed dial mounted on the housing 12. Based on the rotor rotational position signals from the position sensors 203 and the variable voltage signal, controller 218 outputs drive signals UH, VH, WH, UL, VL, and WL through the gate driver 219, which provides a voltage level needed to drive the gates of the semiconductor switches within the power switch circuit 205 in order to control a PWM switching operation of the power switch circuit 205.

In an embodiment, power supply regulator 221 may include one or more voltage regulators to step down the power supply to a voltage level compatible for operating the controller 218 and/or the gate driver 219. In an embodiment, power supply regulator 221 may include a buck converter and/or a linear regulator to reduce the power voltage of battery down to, for example, 15V for powering the gate driver 219, and down to, for example, 3.2V for powering the controller 218.

In an embodiment, electronic control module 200 additionally includes with a power contact switch 230 and a flyback diode 232 disposed in parallel to the power contact switch 230. Power contact switch 230 is a contact ON/OFF switch coupled to the trigger switch 36 and/or a separate ON/OFF switch provided on the power tool 10 for starting the operation of the motor 28.

In an embodiment, controller 218 may be configured to implement various protections for the power tool components and the power tool operator. One example of such protection is an anti-kickback protection. Generally, many power tools operable to perform cutting, drilling or grinding operations, may encounter an impending kickback condition due to local changes in workpiece hardness, workpiece binding, tool obstruction from burrs, and so forth. For example, when cutting a metal surface, a kickback may occur when the cutting wheel grabs or jams on a bump in the surface, which may cause the operator to lose control of the tool. Such a condition also causes a rapid rise in the output torque and a corresponding spike in the electrical current, which can damage the electronic components of the power tool if unchecked.

Various anti-kickback protection schemes for power tools have been employed over the years. One such example is US Reissue Patent RE44993E1, which is incorporated herein by reference in its entirety, and discloses a system that detects a kickback condition when the motor current exceeds a predetermined kickback current threshold, and takes protective action (e.g., by shutting down the tool) accordingly.

Other anti-kickback schemes rely on detection of a stuck rotor condition, i.e., when the rotational speed of the motor output shaft as detected by the position sensors 203 equals substantially zero for a predetermined amount of time (e.g., 50 ms), or an underspeed condition, i.e., when the rotational speed of the motor falls below a predetermined underspeed threshold that is well below the normal operating speed of the motor for a predetermined amount of time (e.g., 50 ms).

Additionally, and/or alternatively, anti-kickback schemes may rely on detection of a buzz event, i.e., when the rotor is detected to move back and forth between two adjacent rotational sectors. In an embodiment, a buzz event may occur in high-inductance and high-power motors, where the induced current of the motor may cause it to jerk backward opposite its present sector. In an embodiment, a single buzz event may be detected when the rotor is detected to move in a forward, reverse, and forward sequence between two adjacent rotational sectors. In an embodiment, detection of one or more buzz events may be indicative of stuck rotor condition necessitating the protective action for anti-kickback protection.

A problem that arises with implementation of various anti-kickback schemes is in high power and high torque power tools such as large angle grinders (LAGs). In an embodiment, due to the large size of the power tool accessory (e.g., the grinding disc or alike) commonly used for such power tools and the large amount of power required to cause the accessory to start rotating at start-up, it has been seen that engagement of the accessory with the workpiece at tool start-up may cause the current level to rise to significantly high levels so as to exceed the limit of the kickback current threshold, or accelerate the accessory so slowly that the output rotary speed of the motor falls below the underspeed threshold. The power tool thus inadvertently shuts down inadvertently at start-up even though there is no actual kickback event. Frequent occurrence of inadvertent shutdowns is frustrating to the operator and should preferably be avoided.

To solve this problem, according to an embodiment, the power tool is allowed to temporarily enter a constant-clutch mode at start-up, whereby the anti-kickback protection thresholds are modified for a set period of time (herein referred to as the "constant clutch time") until the tool achieves a normal operating speed. In an embodiment, the controller 218 may be configured to switch from a normal start-up mode of operation to a constant-clutch mode of operation after tool start-up if it detects, for example, a stuck rotor condition for a predetermined amount of time (e.g., 20-30 ms), or a combination of high current condition (e.g., current exceeding 200 A for 20-30 ms) and low speed (e.g., speed less than 300-400 rpm). In an embodiment, in the constant-clutch mode of operation, the controller 218 may pause enforcement of at least some of the anti-kickback prevention schemes described above, or set the time limits for such enforcements to a period that is greater than or equal to the constant clutch time.

The constant-clutch mode provides tactile feedback to the operator indicative of the power tool's attempt to ramp up speed. This feature further provides the operator an opportunity to recognize the stall condition and adjust the applied bias or move the power tool away from the workpiece to reduce the load on the motor and allow it to ramp up speed. By doing so, the constant-clutch mode allows the tool to stay in a stuck rotor (stall condition) or a high current state for a longer period at a lower current limit and the operator can adjust the tool around to allow the tool to ramp, avoiding nuisance shutdowns at start-up that could occur due to the shorter duration of the protection limits.

Figure 3:
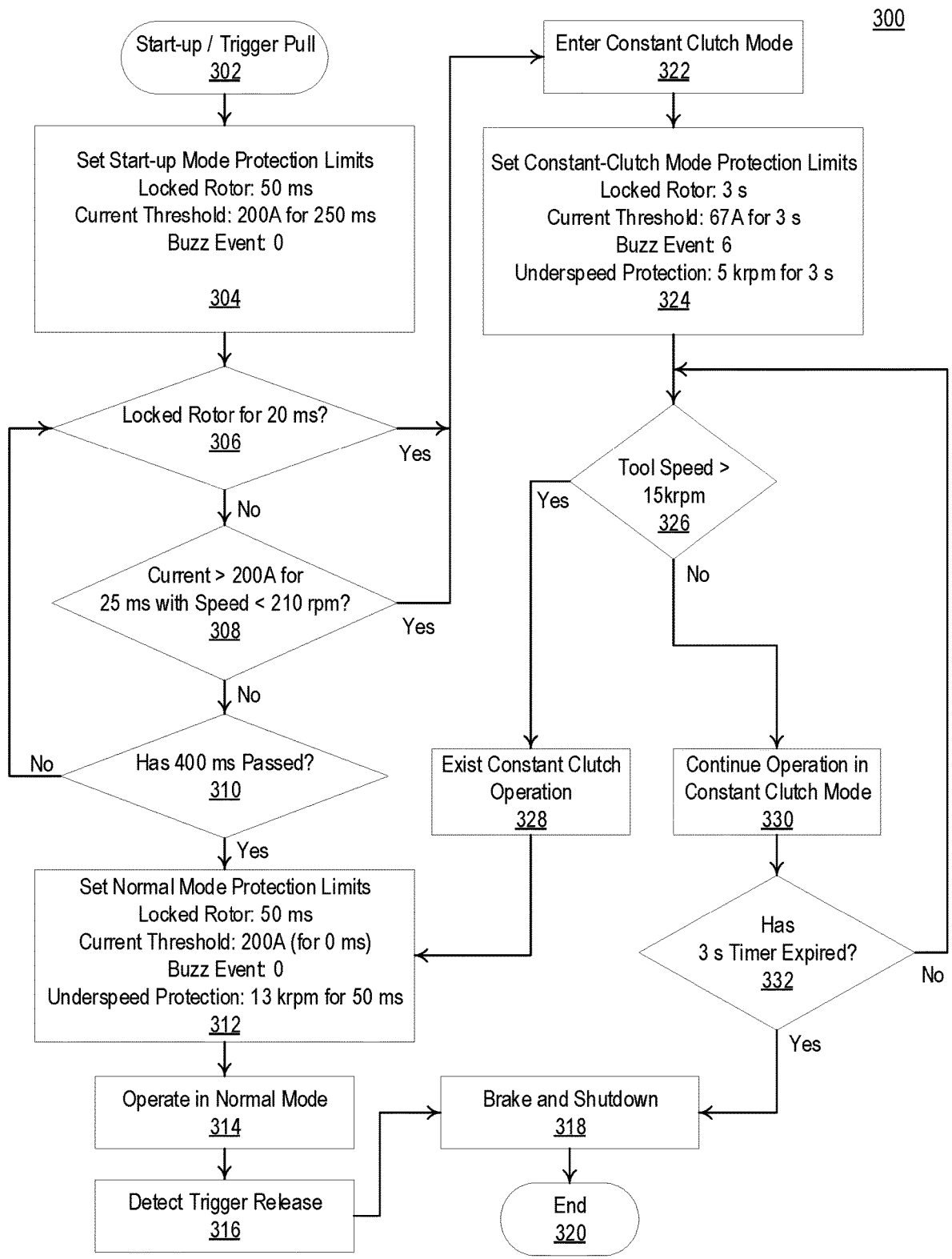
FIG. 3 depicts an exemplary flow diagram for implementing a constant-clutch operation at power tool start-up, according to an embodiment.

FIG. 3 depicts an exemplary process diagram 300 for implementation of a constant-clutch mode at tool start-up, according to an embodiment. In an embodiment, process 300 start with the start-up step 302, which may occur upon the initial actuation of the power tool trigger switch. In an embodiment, in step 304, the controller 218 sets various protection limits in a start-up mode of operation. These include, but may not be limited to, setting the stuck rotor time limit to a first stuck rotor time threshold (e.g., 30 ms to 90 ms, preferably approximately 50 ms); setting the current threshold for kickback protection to a first kickback current threshold (e.g. 150 A to 250 A, preferably approximately 200 A) for a set amount of time (e.g., approximately 250 ms); and setting the buzz event threshold to zero. In an embodiment, in this step, the controller 218 may be configured to clip the current to the first kickback current threshold for the set amount of time using, for example, a cycle-by-cycle current limiting scheme. An example of cycle-by-cycle current limiting is described in U.S. Pat. No. 10,411,558, which is incorporated herein by reference in its entirety.

In an embodiment, in step 306, the controller 218 examines whether the rotor has been in a stuck rotor condition for a first set period of time (e.g., 20 ms). The controller further examined, in step 308, whether the current has exceeded the first kickback current threshold for a second set period of time (e.g., 25 ms) while the speed of the rotor is less than a minimum speed threshold (e.g., 210 rpm). If neither of these conditions are present, the controller 218 continues on to step 310, where it continues to operate in the start-up mode until a prescribed start-up time period (e.g., 300 ms to 500 ms, preferably approximately 400 ms) has passed.

In an embodiment, in step 312, after the conclusion of the start-up mode, the controller 218 sets the various protection limits in the normal mode of operation. In an embodiment, these protection limits may be similar to those set for start-up time, though the current limit is strictly set to first kickback current threshold without an associated time margin. In an embodiment, the controller 218 may also set an underspeed protection threshold to a first speed and a corresponding first time threshold (e.g., 13 krpm for 50 ms), where if the output speed of the motor falls below the first speed for the duration of the first time threshold, the controller 218 takes protective action to shut down the tool. The controller 218 continues to operate in the normal mode in step 314 until it detects a trigger release in step 316. The controller than executed electronic braking of the motor in step 318 to shut down the motor. The process ends in step 320.

If the controller 218 determines that the rotor has been in a stuck rotor condition for the first set period of time in step 306, or that the current has exceeded the first kickback current threshold for the second set period of time (e.g., 25 ms) while the speed of the rotor is less than the underspeed threshold in step 308, it proceeds to step 322 to enter the constant clutch mode of operation. Occurrence of either of these conditions is likely due to the operator attempting to engage the tool accessory with the workpiece too early during tool start-up, thus causing the motor speed to ramp up too slowly and the motor current to spike too rapidly. In an embodiment, in step 324, the controller 218 modifies at least some the various protection limits in the constant-clutch mode of operation to allow the motor speed to ramp up without shutting down the tool as a result of enforcement of the start-up mode protection limits. More importantly, in an embodiment, the controller 218 increases the time limits associated with the protection limits to a value greater than or equal to the constant clutch time period. The constant clutch time period is approximately 2 to 5 s, in this example 3 s). In an embodiment, in this step, the controller 218 is configured to set the stuck rotor time limit to the constant clutch time period; set the current threshold for kickback protection to a second kickback current threshold (e.g. less than 100 A, preferably approximately 67 A) for the constant clutch time period; set the buzz event threshold to a value greater than zero (e.g., 6), and set the underspeed protection threshold to a second speed (e.g., 5 krpm) for the constant clutch time period. These modified protection limits ensure that for at least for the duration of the constant clutch time period after the tool start-up, the power tool does not shut down due to high current draw by the motor resulting from engagement of the accessory with the workpiece.

In an embodiment, after setting the various protection limits in the constant-clutch mode of operation in step 324, the controller 218 proceeds to periodically check whether the rotational speed of the motor exceeds a normal operating speed threshold (e.g., 12 krpm to 20 krpm, preferably approximately 15 krpm) at step 326. If at any point the speed exceeds this limit, the controller 218 exists the constant clutch mode of operation in step 328 and enters the normal operation mode of step 312. Otherwise, the controller 218 remains in the constant clutch mode in step 330, until it determines that the constant clutch time period (e.g., 3 s) has expired in step 332. If the constant clutch time period expires without the output speed exceeding the normal operating speed threshold, the controller 218 proceeds to brake and shut down the motor in step 318 and end the process in step 320.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A method of operating a power tool having a motor and a controller, the method comprising:
   setting a protection time limit associated with a condition of the motor;
   taking protective action to shut down the motor if the condition of the motor persists for a duration of the protection time limit; and
   in response to occurrence of the condition during a start-up period of operation of the motor where an output speed of the motor is between zero and a minimum speed threshold, extending the protection time limit by a duration of a constant-clutch time period to allow an output speed of the motor to reach or exceed a normal operating speed threshold that is greater than the minimum speed threshold, and taking protective action to shut down the motor if the output speed of the motor remains below the normal operating speed threshold for the duration of the constant-clutch time period.

2. The method of claim 1, wherein the condition of the motor is an overcurrent condition where a current level drawn by the motor exceeds a protective current threshold.

3. The method of claim 1, wherein the protection time limit associated with the condition of the motor is set to a first time value during the start-up period of operation of the motor and to a second time value that is less than the first time value during a normal operation of the motor.

4. The method of claim 1, wherein the condition of the motor is an underspeed condition where the output speed of the motor is smaller than an underspeed threshold.

5. The method of claim 4, wherein the underspeed threshold is set to a value that is smaller than the speed threshold during a normal operation of the motor.

6. The method of claim 1, wherein the extending the protection time limit step is in response to at least one of the motor being in a stuck rotor condition or the output speed of the motor being below a minimum speed threshold while the current draw exceeds a current threshold.

7. The method of claim 1, wherein the protective action comprises electronically braking the motor.

8. A power tool comprising:
a housing;
a motor disposed within the housing; and
a control unit configured to control a supply of power to the motor from a power source, the control unit comprising a controller configured to set a protection time limit associated with a condition of the motor and take protective action to shut down the motor if the condition of the motor persists for a duration of the protection time limit,
wherein, in response to occurrence of the condition during a start-up period of operation of the motor where an output speed of the motor is between zero and a minimum speed threshold, the controller extends the protection time limit by a duration of a constant-clutch time period to allow an output speed of the motor to reach or exceed a normal operating speed threshold that is greater than the minimum speed threshold, and takes protective action to shut down the motor if the output speed of the motor remains below the normal operating speed threshold for the duration of the constant-clutch time period.

9. The power tool of claim 8, wherein the condition of the motor is an overcurrent condition where a current level drawn by the motor exceeds a protective current threshold.

10. The power tool of claim 8, wherein the protection time limit associated with the condition of the motor is set to a first time value during the start-up period of operation of the motor and to a second time value that is less than the first time value during a normal operation of the motor.

11. The power tool of claim 8, wherein the condition of the motor is an underspeed condition where the output speed of the motor is smaller than an underspeed threshold.

12. The power tool of claim 11, wherein the underspeed threshold is set to a value that is smaller than the speed threshold during a normal operation of the motor.

13. The power tool of claim 8, wherein the controller extends the protection time limit step is in response to at least one of the motor being in a stuck rotor condition or the output speed of the motor being below a minimum speed threshold while the current draw exceeds a current threshold.

14. The power tool of claim 8, wherein the protective action comprises electronically braking the motor.

15. A power tool comprising:
a housing;
a motor disposed within the housing; and
a control unit configured to control a supply of power to the motor from a power source, the control unit comprising a controller configured take protective action to shut down the motor if an operating parameter of the motor exceeds at least one anti-kickback protection limit,
wherein the controller is configured to set the at least one anti-kickback protection limit is to a first value during a start-up period of operation of the motor where an output speed of the motor is between zero and a minimum speed threshold, and set the at least one anti-kickback protection limit is to a second value that is smaller than the first value during a normal operation of the motor where the output speed of the motor exceeds a normal operating speed threshold that is greater than the minimum speed threshold.

16. The power tool of claim 15, wherein the at least one anti-kickback protection limit comprises a current limit and a prescribed time limit, wherein the protective action is taken when an amount of electric current supplied to the motor exceeds the current limit for the duration of the prescribed time limit, and wherein the controller is configured to set the prescribed time limit to the first value during the start-up period of operation of the motor and to the second value during the normal operation of the motor.

17. The power tool of claim 15, wherein the at least one anti-kickback protection limit comprises an underspeed threshold, wherein the protective action is taken when the output speed of the motor is smaller than the underspeed threshold.

* * * * *